United States Patent [19]

Wang

[11] 4,152,494
[45] May 1, 1979

[54] FLAME RESISTANT, HEAT INSULATIVE FOAMED POLYPHENYLENES

[75] Inventor: Chen-Shen Wang, Naperville, Ill.

[73] Assignee: Standard Oil Company (Indiana), Chicago, Ill.

[21] Appl. No.: 865,401

[22] Filed: Dec. 29, 1977

[51] Int. Cl.$^2$ .................... C11D 43/00; C08J 9/00
[52] U.S. Cl. ...................................... 521/91; 252/62; 428/306; 428/310; 428/317; 428/921; 521/50; 521/122; 521/134; 521/189; 521/907
[58] Field of Search .................. 252/62; 260/2.5 FP, 260/2.5 HB; 428/920, 921, 306, 308, 309, 310, 317; 521/50, 91, 122, 134, 189, 907

[56] References Cited

U.S. PATENT DOCUMENTS

| | | | |
|---|---|---|---|
| 2,361,438 | 10/1944 | Turner | 428/306 |
| 3,124,542 | 3/1964 | Kohn | 260/2.5 |
| 3,582,502 | 6/1971 | Farrow et al. | 260/2.5 L |
| 3,792,099 | 2/1974 | Wang et al. | 260/668 R |
| 3,798,281 | 3/1974 | Wang et al. | 260/470 |
| 3,829,518 | 8/1974 | Wennerberg | 260/670 |
| 3,855,332 | 12/1974 | Wang | 260/470 |
| 4,049,593 | 9/1977 | Sato et al. | 260/2.5 E |
| 4,055,695 | 10/1977 | Last et al. | 428/195 |

FOREIGN PATENT DOCUMENTS 2058431 3/1971 France.

OTHER PUBLICATIONS

Conroy; A. P., and Skinner; D. L., "Process Mineral Fiber-A New Filler/Reinforcement for Polypropylene," 31st Annual Technical Conference, 1976, Reinforced Plastics/Composites Institute, The Society of the Plastics Industry, Inc., pp. 1–3.

*Primary Examiner*—P. E. Willis, Jr.
*Attorney, Agent, or Firm*—Wallace L. Oliver; Arthur G. Gilkes; William T. McClain

[57] ABSTRACT

A low density, flame-resistant foamed composition is formed by heating a thorough mixture of branched polyphenylene and an inorganic fiber to above about 800° F.

8 Claims, No Drawings

FLAME RESISTANT, HEAT INSULATIVE FOAMED POLYPHENYLENES

BACKGROUND OF THE INVENTION

This invention relates to foamed compositions and particularly to a foamed composition formed from branched polyphenylene and an inorganic fiber.

There is a need for a light weight, highly flame resistant material with insulative properties. Such material would be useful in the building, furniture, appliance, transportation and processing equipment industries. Branched polyphenylene and composites made therefrom, which are flame resistant, have been described in U.S. Pat. Nos. 3,792,099, 3,798,281, 3,829,518, and 3,855,332 all incorporated by reference herein. However, these materials as such generally are dense and not particularly suitable for lightweight uses. Applicant now has discovered a foamed branched polyphenylene-based material which is a lightweight, rigid material with heat insulative properties.

SUMMARY OF THE INVENTION

A low density, flame resistant foamed composition is formed by heating a thorough mixture of branched polyphenylene and an inorganic fiber to above about 800° F.

BRIEF DESCRIPTION OF THE INVENTION

The branched polyphenylenes useful in producing the flame-resistant, rigid foams of this invention are those novel polyphenylenes disclosed by Wennerberg and Wary in U.S. Pat. No. 3,792,099 and produced by the processes described in U.S. Pat. Nos. 3,829,518 and 3,798,281. The polymers are composed essentially of carbon and hydrogen in aromatic ring structures, with the rings chemically linked to each other through ortho, meta and para positions. Such branched polyphenylenes should have at least about 8% by weight of its benzene ring structures bonded to three or more other benzene ring structures, that is, it should be at least 8% branches. Such branched polyphenylene can also be characterized by the relative amounts of the linear infrared absorbance spectrum integrated peak area within the frequency range 726–930 cm$^{-1}$. In general about 7 to 18%, preferably 10 to 18%, of the total integrated peak area within the frequency range 726–930 cm$^{-1}$ should fall within the frequency range 854–930 cm$^{-1}$ (I region). The frequency range 806–853 cm$^{-1}$ (P region) generally accounts for about 15 to 30%, preferably 18 to 26%, of the total integrated peak area. The frequency range 778–805 cm$^{-1}$ (M region) accounts for about 13 to 20% of the total integrated peak area.

Branched polyphenylene alternatively can be characterized by the amount of the various types of benzene ring structures present in the polymer chains, which is determined according to the equation:

$$A/c = ba*.$$

In this equation the term "A" is the planimeter area reading for the particular absorption frequency range corrected by a constant factor relating to the planimeter used in the measurement and is in units of cm$^{-1}$. The values of A for the region between 854 and 930 cm$^{-1}$ are corrected for the presence of meta-disubstituted benzene ring structures by applying a correction factor obtained from the value of A for the region 778–805 cm$^{-1}$. The correction factor is one-third of the A value for the 778–803 cm$^{-1}$ region. The term "b" is the thickness of the RBr pellet in units of cm. The term "a*" is the integrated absorptivity in units of g$^{-1}$ l cm$^{-2}$. The values for a* are obtained from the integrated peak areas of the reference compounds determined under essentially the same operating conditions used for obtaining the spectra for the polyphenylenes. The term "c" is the concentration, in grams per liter, of any of the characteristic benzene ring structures associated with the regions of I, P, M and PH. The amount of the various types of benzene ring structures present in the polymer chain is determined by dividing the measured concentration obtained from a particular frequency range by the sum of the concentrations obtained from the four frequency ranges involved. Further details of this procedure are described in U.S. Pat. No. 3,792,099.

By the above-described analysis, the amount of benzene ring structures in the branched polyphenylene polymer chains which are at least trisubstituted, that is, bonded to three or more other benzene ring structures, is at least about 8% by weight, preferably 10% by weight and is more preferably from about 12 to about 25 percent by weight. The amount of benzene ring structures which are disubstituted, bonded to two other benzene ring structures through either the para, meta, or ortho positions, is preferably from about 45 to about 65 percent by weight. The amount of benzene ring structures which are meta-disubstituted, bonded through the meta position to two other benzene ring structures, is preferably from about 15 to about 35 percent by weight. The terminology "double bonding through the meta position" refers to the bonding of a benzene ring structure to two other benzene ring structures through the meta positions of the benzene ring structure. The remaining benzene ring structure is the polymer chains are bonded to only one other benzene ring structure.

The inherent viscosity (I.V.) of the branched polyphenylenes can vary from about 0.025 or less to more than 0.17 when measured in trichlorobenzene at 135° C. at a concentration of 0.02 g/ml. This roughly corresponds to a number average molecular weight range of from 1000 or less to greater than 10,000. A number average molecular weight range of about 3,000 to 10,000 is particularly advantageous for the preparation of the nitropolyphenylenes of this invention.

A particularly preferred branched polyphenylene resin is that prepared from biphenyl by the dehydrogenative coupling process described in U.S. Pat. Nos. 3,829,518 and 3,798,281.

The inorganic fibers useful in this invention include mineral fibers and asbestos fibers. The preferable fiber is a processed mineral fiber (Jim Walter Resources, Inc., Birmingham, Ala.), typical properties of which are shown in Table I.

Table I

| Typical Properties of Processed Mineral Fiber | |
|---|---|
| Chemical Analysis | Wt. % |
| SiO$_2$ | 42.1 |
| Al$_2$O$_3$ | 8.1 |
| CaO | 35.4 |
| MgO | 7.8 |
| Other Inorganics | 6.6 |
| Physical Properties | |
| Color | White to light gray |
| Fiber size | 1–10 microns |
| Diameter | average 2–5 microns |
| Aspect ratio | average 40–60 |
| Non fibrous material | 1–4% |

Table I-continued

| | |
|---|---|
| Bulk density | 25 lbs./cu. ft. |
| Specific gravity | 2.7 |
| Flexibility | Brittle |
| Flammability | Does not burn |
| Tensile strength | 3000–200,000 psi |
| (Single fiber) | Average 70,000 psi |
| Elastic modulus | $1.5 \times 10^7$ psi |
| Heat resistance | Good to 1400° F. |
| Glass transition temperature | 1400° F. |
| Devitrification temperature | 1560° F. |
| Melting point (T fus) | 2300–2400° F. |

Mineral fibers suitable in this invention contain such inorganic substances as silica, alumina and Group II metal oxides. The aspect ratio, i.e. the ratio of length to width, of suitable fibers can be from about 30 to about 100.

The compositions of this invention generally comprise from about 20 to about 70 wt.% branched polyphenylene and from about 80 to about 30 wt.% inorganic fiber. In addition up to about 10 wt.% polyphenylene sulfide can be included. A particularly advantageous composition contains about 30 wt.% branched polyphenylene and about 70 wt.% processed mineral fiber. Another favored composition contains about 24 wt.% branched polyphenylene, about 70 wt.% processed mineral fiber and about 6 wt.% polyphenylene sulfide.

The foamed compositions of this invention are formed by first thoroughly mixing branched polyphenylene, inorganic fiber and, optionally, sulfide. By thorough mixing, it is meant that the components are homogenized to an extent that generally individual particles of each component are completely dispersed among each other. The particle size of the components should be small enough to permit complete dispersement, which usually is under about −25 mesh and preferably is under about −50 mesh. One method of thorough mixing is performed in a Waring Blender.

To produce a foamed composition of this invention the previously-described mixture of components is heated at temperatures typically raning from about 800° to 1300° F. and preferably from about 900 to 1000° F. for a time sufficient to produce foaming. Typically such time can be about 15 to 30 minutes, preferably about 20 to 25 minutes, although other times are operable.

Various densities of foamed material can be obtained by varying the foaming time and tempertures. The density of the foam of this invention should be less than about 1 g/cc and greater than about 0.2 g/cc. For most applications the density should be less than about 0.5 g/cc. Generally, higher the temperatures and longer times produce a less dense product. Typically, the mixture containing branched polyphenylene and inorganic fiber is placed in a mold and subjected to a contact pressure of up to about 5 psi during the foaming operation.

The resulting foam is rigid and has heat insulative properties. Unlike polyurethane-type insulations, the foamed polyphenylene of this invention does not give off cyanide-type fumes when subjected to extreme heat. The flame-resistance and ability to be formed into rigid structures make such an insulating from advantageous in electrical appliances such as television sets.

This invention is demonstrated, but not limited by the following Examples.

EXAMPLE I

A branched polyphenylene resin was prepared by polymerizing biphenyl with a $MoO_3 \cdot SiO_2 \cdot Al_2O_3$ catalyst. Such materials were placed in an autoclave which was then charged with 300 psi of hydrogen and heated to 1065° F. for 5½ to 6 hours. The resulting branched polyphenylene product was dissolved in N-methylpyrrolidone, precipitated with methanol, separated and dried. After 10.8 g (30 wt.%) such polyphenylene resin (0.143 I.V.) and 25.2 grams (70 wt.%) processed mineral fiber were mixed thoroughly in a Waring Blender for about five minutes at about 300–500 rpm, the mixture was placed in a three-inch square mold, subjected to a pressure of about 5 psi and heated to 1050° F. for 20 minutes. The resulting foam was removed from the mold after it had cooled to about 200° F. The properties of such foam are showin in Table II. The foam had excellent dimensional stability while being subjected to a flame.

TABLE II

| | Mechanical Properties (psi) | | | | | |
|---|---|---|---|---|---|---|
| | at 20° C. | | at 400° C. | | | |
| Example | Flexural Strength | Flexural Modulus | Flexural Strength | Flexural Modulus | Density (g/cc) | Porosity (%) |
| I | 1,300 | 33,000 | 1,600 | 276,000 | 0.912 | 55.31 |
| II | 2,200 | 25,000 | 2,100 | 225,000 | 0.925 | 57.24 |

EXAMPLE II

A thorough mixture of 8.6 grams (24 wt.%) branched polyphenylene, prepared as described in Example I, 2.2 grams (6 wt.%) polyphenylene sulfide (Phillips 66) and 25.2 grams (70 wt.%) processed mineral fiber was foamed as described in Example I. The properties of this foam are shown in Table II.

Example III-IV

A thorough mixture of 58.8 grams branched polyphenylene (0.106 I.V., Softening point=270° C.) and 137.2 grams of processed mineral fiber (aspect ratio=90) was foamed at 1100° F. for 107 minutes in a mold without any contact pressure. Properties of two branched polyphenylene foams and one rigid polyurethane foam are presented in Table III.

TABLE III

| | | Mechanical Strength (psi) | | | |
|---|---|---|---|---|---|
| Example | Density (g/cc) | Flexural Strength | Flexural Modulus | Compressive Strength | Thermal Conductivity (BTU - in./hr : ft$^2$ - °- F.) |
| III | 0.54 | 229 | 29,000 | 128 | 0.47 |
| IV | 0.44 | 178 | 15,000 | 267 | 0.46 |
| Rigid Polyurethane | 0.03 | — | — | 20–50 | 0.14 (1) |

TABLE III-continued

| Example | Density (g/cc) | Mechanical Strength (psi) | | | Thermal Conductivity (BTU - in./hr : ft² - °- F.) |
| --- | --- | --- | --- | --- | --- |
| | | Flexural Strength | Flexural Modulus | Compressive Strength | |
| Foam | | | | | 0.24 (2) |

(1) closed cell
(2) open cell

I claim:

1. A rigid, foamed composition having a density less than 1, produced by heating a thorough mixture comprising about 20 to about 70 wt.% branched polyphenylene, formed using a metal oxide catalyst, having at least about 8 wt.% of its benzene ring structure bonded to three or more other benzene ring structures and having an inherent viscosity between about 0.025 and about 0.17, and about 80 to about 30 wt.% inorganic fiber selected from the group consisting of processed mineral fiber and asbestos.

2. The foamed composition of claim 1 wherein the inorganic fiber is processed mineral fiber.

3. The foamed composition of claim 1 which has a density of less than about 1 g/cc and greater than about 0.2 g/cc.

4. The foamed composition of claim 3 which has a density of less than about 0.5 g/cc.

5. The foamed composition of claim 2 which has a density of less than about 1 g/cc and greater than about 0.2 g/cc.

6. The foamed composition of claim 5 which has a density of less than about 0.5 g/cc.

7. The foamed composition of claim 1 containing up to about 10 wt.% polyphenylene sulfide.

8. The foamed composition of claim 5 which is formed from about 30 wt.% branched polyphenylene and about 70 wt.% processed mineral fiber.

* * * * *